W. H. HARRISON.
CAGE PERCH.
APPLICATION FILED OCT 11, 1920.
1,425,524.
Patented Aug. 15, 1922.
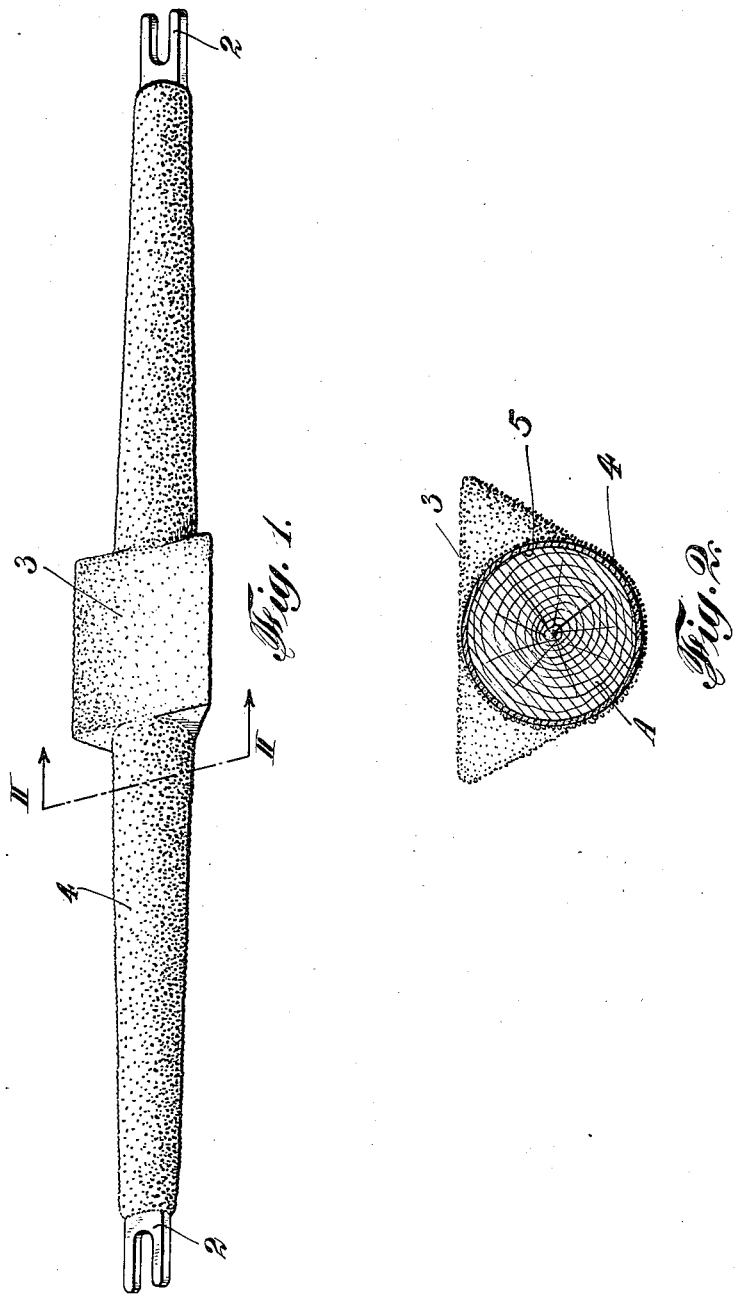
Inventor
Wm. Henry Harrison
By his Attorney

UNITED STATES PATENT OFFICE.

WILLIAM HENRY HARRISON, OF BROOKLYN, NEW YORK.

CAGE PERCH.

1,425,524. Specification of Letters Patent. Patented Aug. 15, 1922.

Application filed October 11, 1920. Serial No. 416,012.

*To all whom it may concern:*

Be it known that I, WILLIAM HENRY HARRISON, a citizen of the United States, and a resident of Brooklyn, county of Kings, and State of New York, have invented certain new and useful Improvements in Cage Perches, set forth in the following specification.

This invention relates to bird cage perches. Its object is so to shape and fashion a cage perch that it must function not only as a perch to support a bird, but to keep its claws in good condition. In fact, it is an object of the invention to provide for the maintenance of a bird in captivity under conditions, so far as its claws are concerned, as nearly as possible approximating nature. Naturally, when free, a bird when not flying is either grasping a twig or limb with its claws or resting or walking on a flat surface. A bird's nails are constantly growing and were it not for the abrasive action of the surface with which the bird's claws contact, there would be a tendency for the nails to become too long. In fact, in captivity birds' nails usually require trimming to prevent serious inconvenience if not ill-health. Any trimming operation is fraught with not a little danger, especially when carelessly done, as the cutting off of too great a length causes the nails to bleed and possibly become infected.

In carrying out the object of the invention, I propose so to shape the cage perch that a considerable portion thereof is in the form of a platform, the top surface of which is substantially flat so as to require a complete spreading of the bird's claws. It is when so spread that the tips of the curling nails directly contact with the supporting surface. By making the surface of the platform abrasive, the desired wearing down of the bird's nails is effected substantially as when the bird is in a natural state. It is also desired that the round part of the perch likewise be covered with the abrasive material.

The above and further objects of the invention will be pointed out more particularly in the accompanying claims which are directed to the illustrative embodiment described in the following specification in connection with accompanying drawings which form a part hereof, in which like characters designate corresponding parts in the several figures. In the drawings—

Fig. 1 is a perspective view of a preferred embodiment of my perch; and

Fig. 2 is a cross section through the cylindrical portion thereof, but drawn to an enlarged scale.

This application is a continuation and, in part, a division of my copending application for patent on cage perch, Serial Number 115,624, filed August 18, 1916.

An elongated body portion A is provided with clips 2, one at each end, in the form of a fork for engaging the bars of the bird cage, to support the perch in an elevated position. Preferably in the neighborhood of mid-position, a flat top platform 3 is suitably formed on the elongated body portion A. Functionally, the top surfaces of the perch are provided with a securely fixed covering 4 of abrasive material such as sand or carborundum, which is satisfactorily fixed against removal by washing through the medium of an underlying layer 5 of shellac, which is applied in the plastic state and to which the abrasive is applied before the shellac has set. This is perhaps the cheapest method of manufacture, in which case the body portion of the perch may be fabricated from a stick of wood. As the abrasive material may easily be applied through the medium of an air-blast, it may be cheaper to permit the entire body portion of the perch to be covered although, as stated, functionally only the top portions and the side portions require the covering.

If desired, the entire perch and platform may be fabricated from a cement concrete mixture of sand or carborundum, in which case the outer abrasive surface is formed by the particles of sand or carborundum in the composition.

What I claim and desire to secure by United States Letters Patent is:—

1. A washable cage perch for captive birds for the combined purpose of supporting the bird and maintaining its claws in normal condition, comprising an elongated member having provisions for sustaining it in an elevated position, and having both an extensive flat top surface and an extensive cylindrical top surface, both said flat and cylindrical top surfaces being of abrasive material to abrade the bird's claws from different angles.

2. A washable cage perch for captive birds for the combined purpose of supporting the bird and maintaining its claws in normal condition, comprising an elongated body member; cage engaging clips at the ends of said body member; a flat top platform formed by said body member; and a covering of abrasive material on the top portions of said perch secured in position by an underlying layer of shellac.

In witness whereof I have signed my name to this specification, this 26th day of August, 1920.

WILLIAM HENRY HARRISON.